(12) United States Patent
Masuda

(10) Patent No.: US 6,181,440 B1
(45) Date of Patent: Jan. 30, 2001

(54) FACSIMILE MACHINE

(75) Inventor: Hiroyuki Masuda, Itami (JP)

(73) Assignee: Minolta Co., Ltd., Osaka (JP)

( * ) Notice: Under 35 U.S.C. 154(b), the term of this patent shall be extended for 0 days.

(21) Appl. No.: 08/746,620

(22) Filed: Nov. 12, 1996

(30) Foreign Application Priority Data

Nov. 10, 1995 (JP) .................................................. 7-292648

(51) Int. Cl.$^7$ ...................................................... H04N 1/00
(52) U.S. Cl. ............................ 358/434; 358/404; 358/444
(58) Field of Search .................................. 358/400, 404, 358/434, 444, 468, 401, 405, 406, 442, 407; 379/100.01, 100.06, 100.09, 102.01

(56) References Cited

U.S. PATENT DOCUMENTS

| | | | | |
|---|---|---|---|---|
| 4,994,926 | * | 2/1991 | Gordon ................................. | 358/407 |
| 5,017,965 | * | 5/1991 | Hashimoto et al. ................. | 355/219 |
| 5,386,303 | * | 1/1995 | Kihara ................................. | 358/405 |
| 5,581,367 | * | 12/1996 | Oogiri et al. ........................ | 358/404 |
| 5,644,405 | * | 7/1997 | Sato ..................................... | 358/404 |
| 5,684,607 | * | 11/1997 | Matsumoto .......................... | 358/442 |
| 5,801,846 | * | 9/1998 | Nobuta ................................. | 358/468 |

\* cited by examiner

Primary Examiner—Jerome Grant, II
(74) Attorney, Agent, or Firm—Burns, Doane, Swecker & Mathis, LLP (57) ABSTRACT

A facsimile apparatus, including a printer for printing image data, a memory for storing image data, a reception unit for receiving image data from a sender facsimile machine, a setting unit for setting memory storage mode whereby reception image data from the sender facsimile machine is stored in the memory and is prohibited from being printed by the printer, an image data write unit for writing reception image data received during a setting of memory storage mode into the memory, a control unit for controlling a first operation and a second operation, wherein the first operation is performed with one of reception image data stored in the memory and reception image data which is being written into the memory, and wherein the second operation is performed with other image data, the other image data being different from the reception image data stored in the memory and the reception image data which is being written into the memory, and a prohibiting unit for prohibiting the first operation when the memory storage mode is set.

40 Claims, 8 Drawing Sheets

FACSIMILE MACHINE

BACKGROUND OF THE INVENTION

1. Field of the Invention

The present invention relates to a facsimile machine, and in particular to a device which can be connected to an information processing apparatus, such as a personal computer or workstation, and which, in addition to performing the traditional functions of a facsimile machine, can also function at least as a printer for such information processing device.

2. Description of the Related Art

In recent years, there has been an increase in the use of facsimile machines which are connected to information processing apparatuses such as personal computers or workstations. In addition to the traditional facsimile functions of the transmission and reception of image data, these facsimile machines are also provided with a variety of functions which enable them to be used as printers for such information processing devices, as scanners, as modems and as copiers. It is also common for such facsimile machines to be equipped with their own memory to allow the reception of image data even when the device has run out of paper.

When a multi-function facsimile machine is used in an office which handles confidential documents, it can be desirable from a security point of view for the device to be set to not print out documents received when no-one is at the office, such as during the night. With such a setting, the reception images are stored in the facsimile memory and printer function of the facsimile machine is disabled. This disabling of the printer function can be achieved, for example, by intentionally removing the supply paper.

There is, however, a disadvantage with the construction described above. When the printer function is disabled to improve the security of data reception, this has the additional effect of disabling other functions, such the ability to serve as a printer for an information processing device.

SUMMARY OF THE INVENTION

It is a primary object of the present invention to provide a facsimile machine which can function normally, with the exceptions of the fundamental functions of the transmission and reception of image data, while maintaining the confidentiality of reception images.

This object can be achieved by a facsimile apparatus comprising: a printer for printing image data; a memory for storing image data; a reception unit for receiving image data from a sender facsimile machine; a setting unit for setting memory storage mode whereby reception image data from the sender facsimile machine is stored in the memory and is prohibited from being printed by the printer; an image data write unit for writing reception image data received during a setting of memory storage mode into the memory; a control unit for controlling a first operation and a second operation, wherein the first operation is performed with one of reception image data stored in the memory and reception image data which is being written into the memory, and wherein the second operation is performed with other image data, the other image data being different from the reception image data stored in the memory and the reception image data which is being written into the memory; and a prohibiting unit for prohibiting the first operation when the memory storage mode is set.

By means of the stated construction, although a first operation, which uses image data which is already stored in the memory or which is being written into the memory, is prohibited when memory storage mode is set, second operations are not prohibited, so that confidentiality can be maintained and the facsimile apparatus can be used as normal, with the exceptions of the fundamental functions of the transmission and reception of image data.

Here, the control unit may further control a polling reception operation, wherein the polling reception operation is an operation which has image data stored by a sender facsimile machine transmitted to the present facsimile apparatus according to an operation by the present facsimile apparatus and which has the present facsimile apparatus receive the image data, wherein the prohibiting unit prohibits a polling reception operation when memory storage mode is set.

Since polling reception operations are also prohibited by the above construction, the confidentiality of images can be maintained.

Here, the facsimile apparatus may further include an interface which can be connected to an external device and which is used for data transfer with the external device; a transferring unit for transferring image data received from the sender facsimile machine to the external device via the interface, when the interface is connected to the external device; and a transfer prohibiting unit for prohibiting any transfer of the reception image data by the transferring unit during memory storage mode.

Here, even when a transfer unit is provided in the facsimile apparatus for transferring reception image data to the external device, such transfers of image data are prohibited during memory storage mode by the transfer prohibiting unit. As a result, the confidentiality of reception images can be properly maintained.

BRIEF DESCRIPTION OF THE DRAWINGS

These and other objects, advantages and features of the invention will become apparent from the following description taken in conjunction with the accompanying drawings which illustrate a specific embodiment of the invention. In the drawings.

DESCRIPTION OF THE PREFERRED EMBODIMENT

Figure 1:
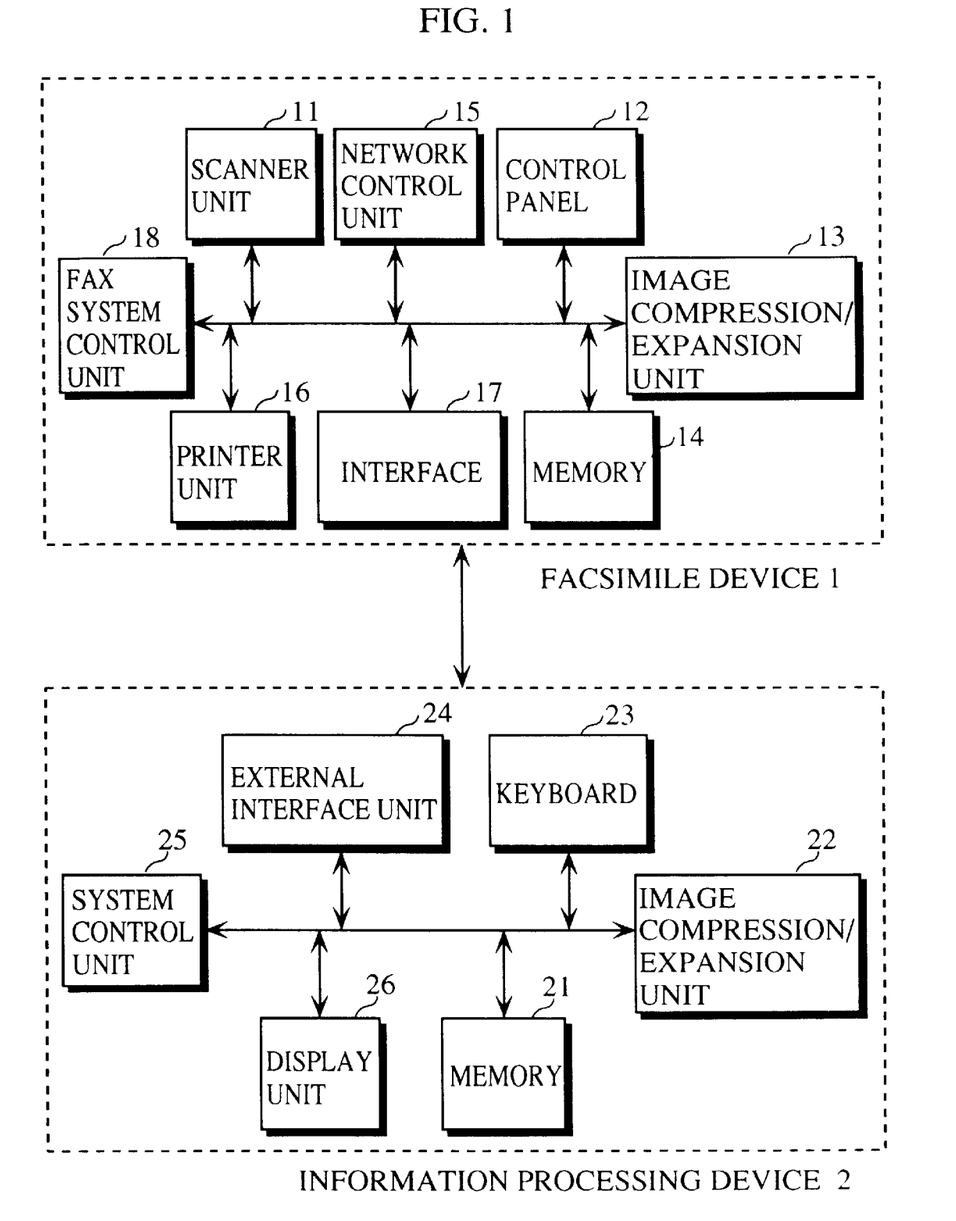
FIG. 1 shows the construction of the facsimile machine 1 of the present invention and of the information processing device 2 to which the facsimile machine 1 is connected.

FIG. 1 shows the construction of the facsimile machine 1 of the present invention and of the information processing device 2, made up of a personal computer, a host computer, a workstation, or the like, to which the facsimile machine 1 is connected. This facsimile machine 1 comprises a scanner unit 11, a control panel 12, an image compression/decompression unit 13, a memory 14, a network control unit 15, a printer unit 16, an interface 17, and a FAX system control unit 18.

The scanner unit 11 includes a document platen upon which a document is placed. It reads the document placed on the document platen and converts it into image data.

The control panel 12 receives a variety of indications from the user. Such indications include indications for setting memory storage mode, indications for canceling memory storage mode, indications for printing out confidential reception images, indications for polling reception, indications for data transmission, and indications for copying. Here, memory storage mode refers a mode in which reception image data from a sender facsimile machine is stored in memory 14 without being printed out or transferred to the information processing device 2. An indication for printing out confidential reception images refers to an indication for a mode whereby image data is printed out after a password which corresponds to a confidential reception password appended to the reception images confidentially transmitted from the sender facsimile machine has been inputted. This is to say, printing out of the reception document is prohibited unless the correct password is inputted by the user. Polling reception refers an indication to the present facsimile machine 1 to have a transmitter facsimile machine transmit image data (which can be a document set on the document platen of the transmitter facsimile machine, image data stored in its memory, or the like) by an operation of the present facsimile machine. An indication for transmission is an indication for a standard transmission of image data. Here, the control panel 12 is provided with a display unit for displaying appropriate messages.

The image compression/decompression unit 13 compresses the images of documents to be transmitted, as well as decompressing the images from the sender facsimile machine.

The memory 14 stores image data of a document to be transmitted and image data received from a sender facsimile machine. These sets of image data are stored with identifiers to indicate whether they are a set of image data received from a sender facsimile machine or a set of image data to be transmitted to another facsimile machine.

The network control unit 15 is made up of a modem and an NCU (Network Control Unit) and is connected to a public communications network. It modulates image data to be transmitted and demodulates image data which has been received.

The printer unit 16 prints out reception images under the control of the FAX system control unit 18. Here, "reception images" refers not only to images received from a sender facsimile machine but also to images transferred from the information processing device 2.

The interface 17 connects the facsimile machine 1 to the information processing device 2 to allow the transmission of images to or from the information processing device 2. It also receives instructions to transmit images, instructions for image print out, instructions for image scanning, and other such instructions from the information processing device 2. Here, image transmission instructions have the facsimile machine 1 transmit images received from the information processing device 2 to a specified communication destination facsimile machine. Image print out instructions have the facsimile machine 1 print out images received from the information processing device 2. Image scan instructions have the scanner unit 11 of the facsimile machine 1 scan a document set on the document platen and transmit the resulting image data to the information processing device 2.

The FAX system control unit 18 controls every component in the facsimile machine 1. Its control procedures are described in detail later in this specification.

On the other hand, the information processing device 2 connected to the facsimile machine 1 is composed of a memory 21 for storing images, an image compression/decompression unit 22, a keyboard 23, an external interface unit 24 which is connected to the interface 17, a system control unit 25 and a display unit 26. The information processing device 2 transmits images to the facsimile machine 1 and receives images sent from the facsimile machine 1. It also issues image transmission instructions, image print out instructions, and image scan instructions which it outputs to the facsimile machine 1.

The following is a detailed description of the control procedures executed by the FAX system control unit 18, with reference to the flowcharts shown in FIGS. 2 through 8.

Figure 2:
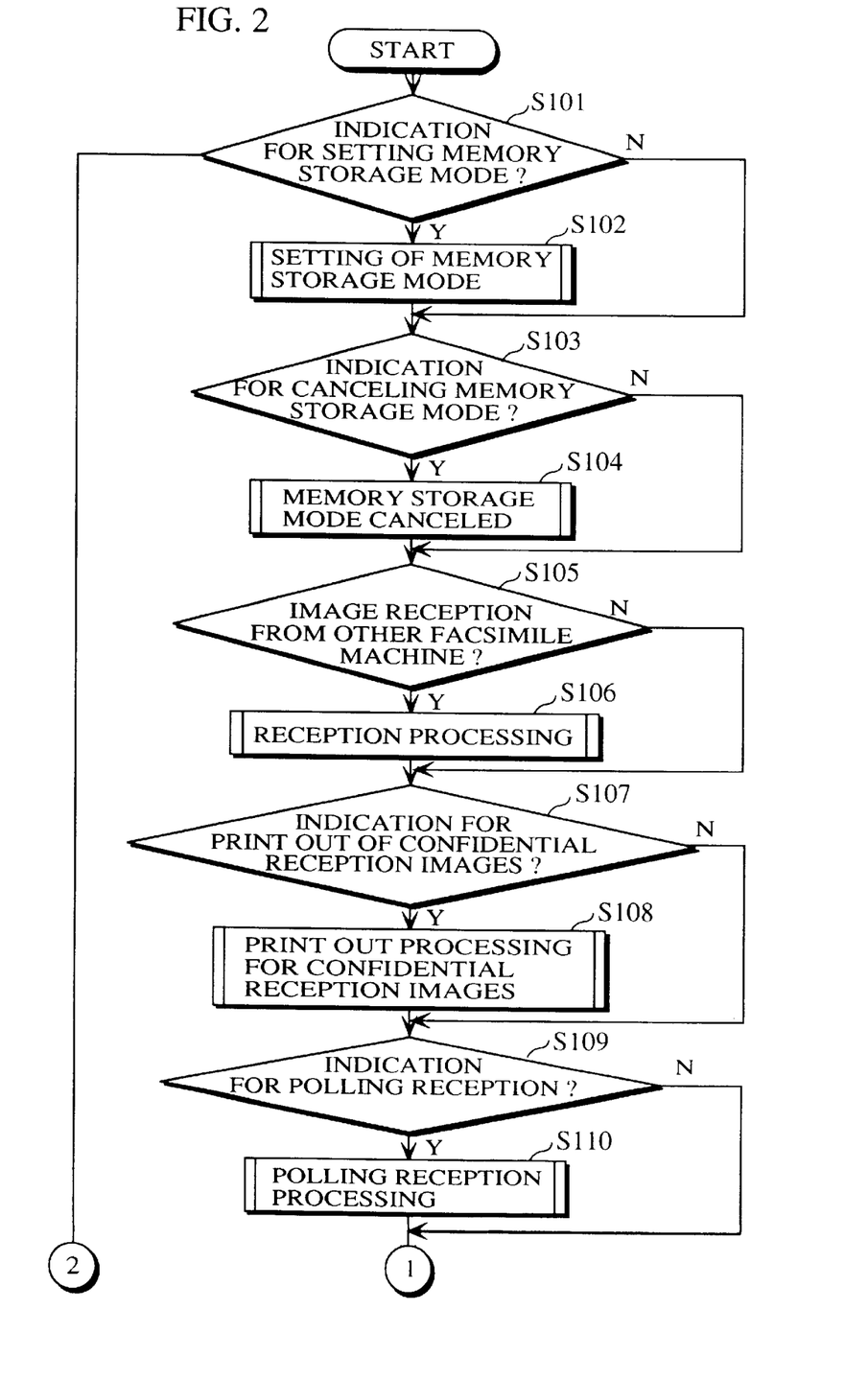
FIG. 2 shows the control flow of the FAX system control unit 18.

First, as shown in FIG. 2, if the indication received by the control panel 12 is an instruction for setting memory storage mode (step S101:yes), the FAX system control unit 18 sets memory storage mode (step S102).

Figure 4:
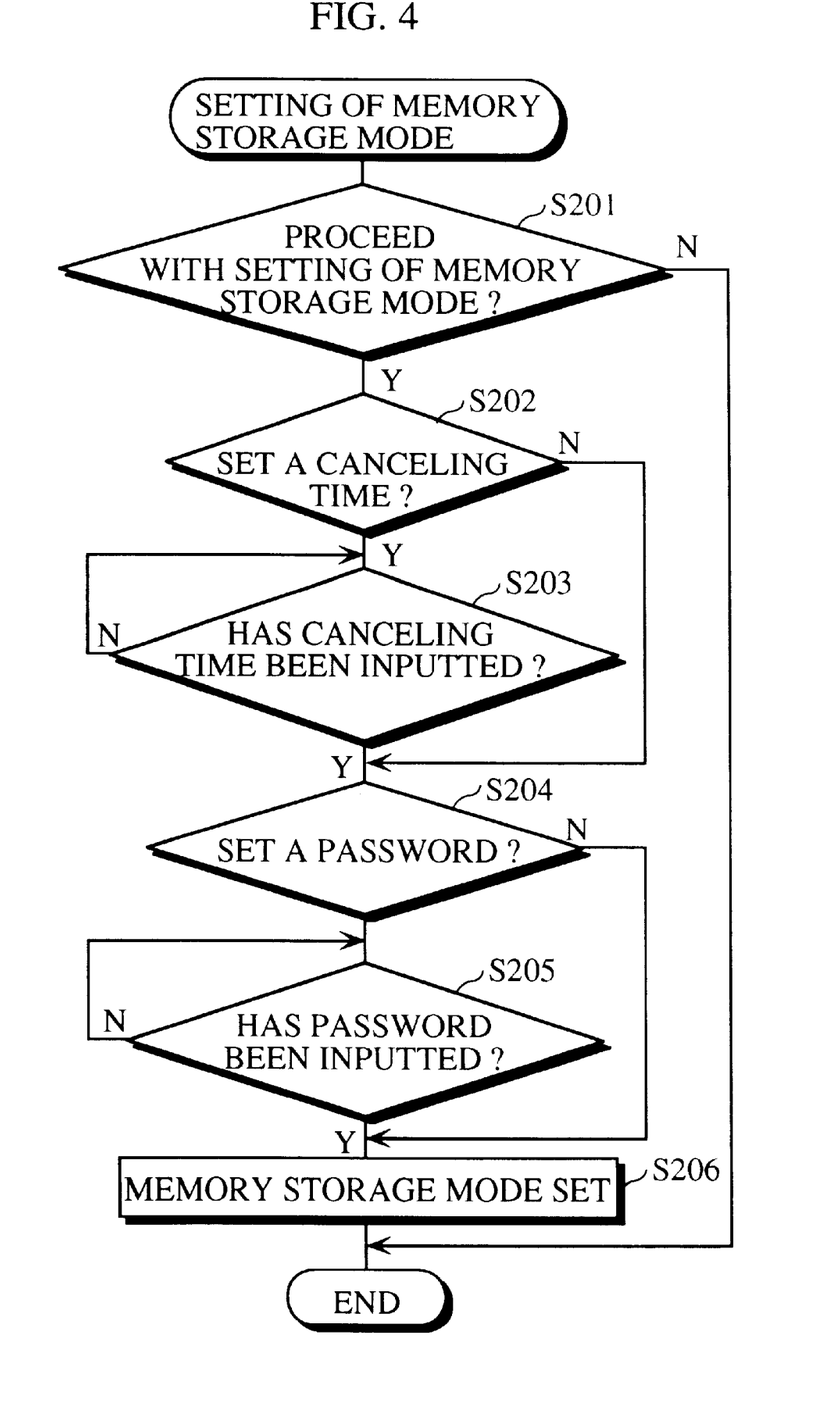
FIG. 4 shows the processing flow for setting memory storage mode.

This setting of memory storage mode is shown in detail by the flowchart in FIG. 4. First, the control panel 12 receives an indication from the user to reconfirm that memory storage mode is to be set (step S201). Next, on receiving an indication confirming the setting of memory storage mode, the control panel 12 receives an indication from the user as to whether to set canceling time for memory storage mode (step S202). This canceling time marks a time at which memory storage mode will be automatically canceled. If the user inputs a canceling time (step S203:yes), the control panel 12 receives an indication from the user as to whether a password is to be used (step S204). Here, the setting of such a password controls whether the input of a password will be necessary when canceling memory storage mode. After an input which sets a password (step S205:yes), the FAX system control unit 18 sets memory storage mode (step S206).

Next, as shown in FIG. 2, if an indication received by the control panel 12 is an indication to cancel memory storage mode (step S103:yes), the FAX system control unit 18 cancels memory storage mode (step S104).

Figure 5:
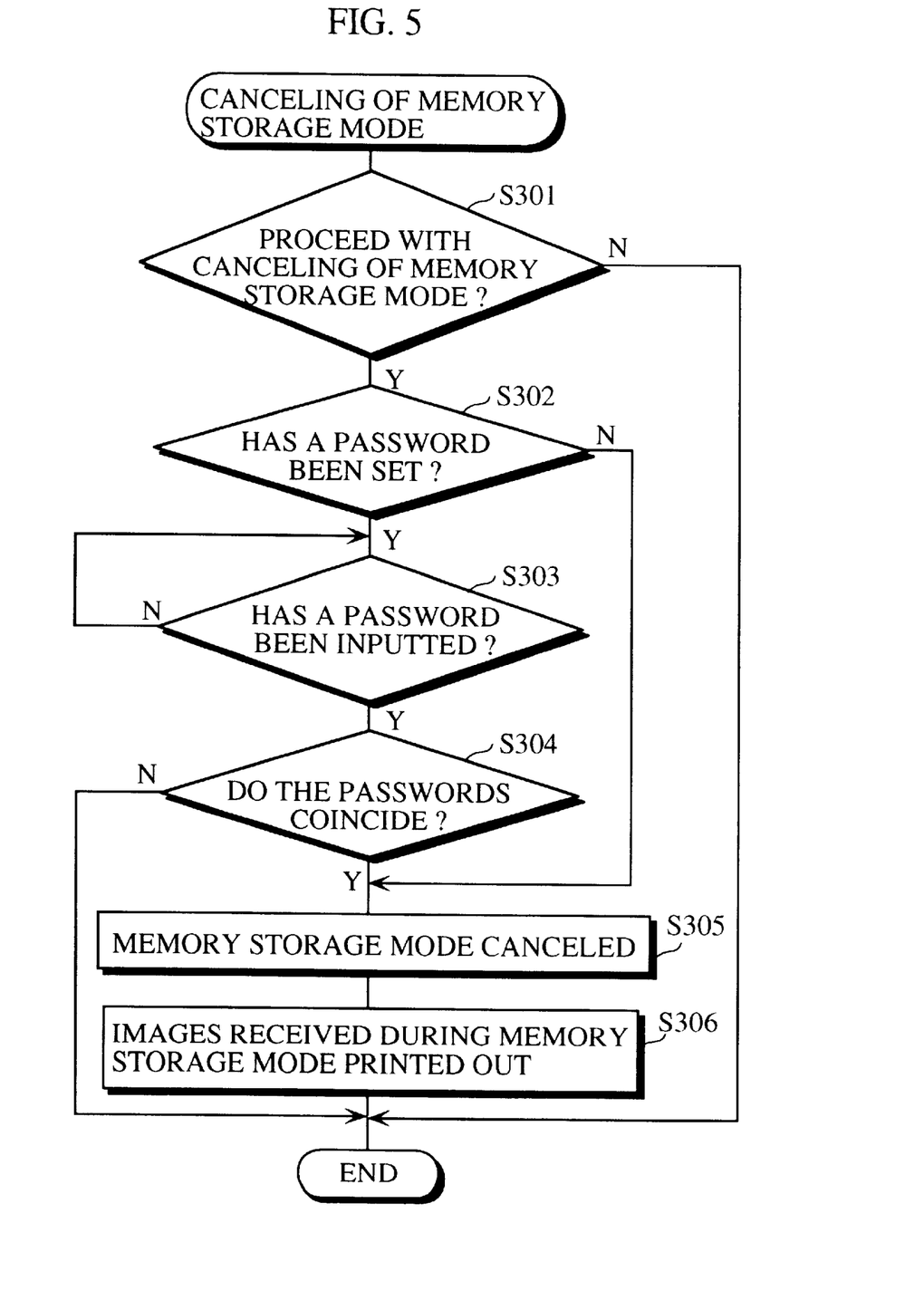
FIG. 5 shows the processing flow for canceling memory storage mode.

This canceling of memory storage mode is shown in more detail by the flowchart in FIG. 5. First, the control panel 12 receives an indication from the user to reconfirm that memory storage mode is to be canceled (step S301). Next, on receiving an indication confirming the canceling of memory storage mode, it is judged whether a canceling password was set when memory storage mode was set (step S302) and when this is the case (S302:yes), the control panel 12 waits for the input of a password (step S303). If there has been an input of a password which coincides with the canceling password inputted when memory storage mode was set (step S304:yes), the FAX system control unit 18 cancels memory storage mode (step S305). It should be noted here that even when there has been no indication to cancel memory storage mode, the FAX system control unit 18 will automatically cancel memory storage mode when a cancelling time which was set together with memory storage mode in step S203 in the flowchart in FIG. 4 is reached.

Next, the printer unit 16 prints out the reception image data stored in the memory 14 which was received from the sender facsimile machine (step S306). Here, the printer unit 16 uses the identifiers appended to the image data to judge whether sets of image data in the memory 14 are image data which has been received from a sender facsimile machine.

Furthermore, as shown in FIG. 2, when images transmitted according to standard facsimile procedures by another facsimile machine are received via the network control unit 15 (step S105:yes), the FAX system control unit 18 performs a reception process (step S106).

Figure 6:
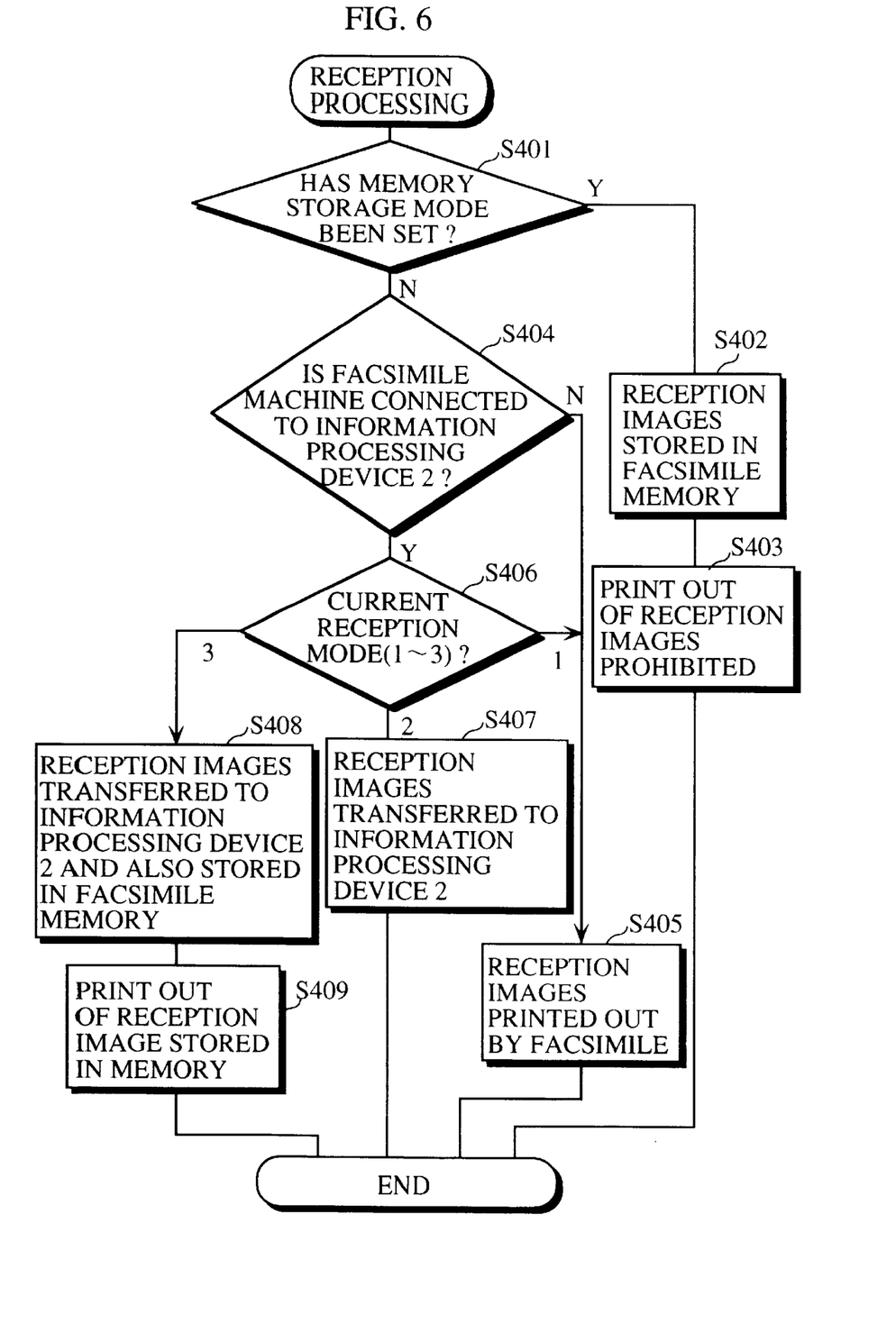
FIG. 6 shows a processing flowchart for reception processing.

This reception process is shown in detail by the flowchart in FIG. 6. First, the FAX system control unit 18 determines whether memory storage mode has been set (step S401). If memory storage mode has been set, the FAX system control unit 18 has the image data received from the sender facsimile machine stored in the memory 14 of the facsimile machine 1 (step S402) and prohibits print out of the reception images by the printer unit 16 of the facsimile machine 1 (step S403). Here, when these images are stored in the memory 14, the images are given an identifier to show whether that they are images which have been received from a sender facsimile machine. On the other hand, when memory storage mode has not been set (Step S401:no) and the facsimile machine 1 has not been connected to the information processing device 2, (step S404:no) the reception images from the sender facsimile machine are printed out by the printer unit 16 (step S405). Here, when memory storage mode has not been set but the facsimile machine 1 has been connected to the information processing device 2 (step S404:yes), the following processes are performed in accordance with the reception mode of the facsimile machine 1. When the reception mode is set as "1", the reception images received from the sender facsimile machine are printed out by the printer unit 16 (step S405). When the reception mode is "2", the FAX system control unit 18 does not have the reception images received from the sender facsimile machine printed out by the printer unit 16 and instead transmits the reception images to the information processing device 2 (step S407). This transmission of the reception images is performed by sending the images via the interface 17 of the facsimile machine 1 to the external interface unit 24 of the information processing device 2. When the reception mode is "3", the FAX system control unit 18 has the reception images received from the sender facsimile machine transmitted to the information processing device 2 in addition to having the reception images stored in the memory 14 (step S408). After this, it has the reception images in the memory 14 printed out by the printer unit 16 (step S409). It should be noted here that when the reception images are confidential reception images, these images will be stored in the memory 14 and not printed out by the printer unit 16, regardless of whether memory storage mode has been set. Here, the judgement as to whether confidential reception is to be performed for the reception images can be made, for example, by judging whether a confidential password has been appended to the reception images.

As shown in FIG. 2, when the control panel 12 has received an indication from the user for a print out of confidential reception images (step S107:yes), the FAX system control unit 18 performs print out processing for the confidential reception images (step S108).

Figure 7:
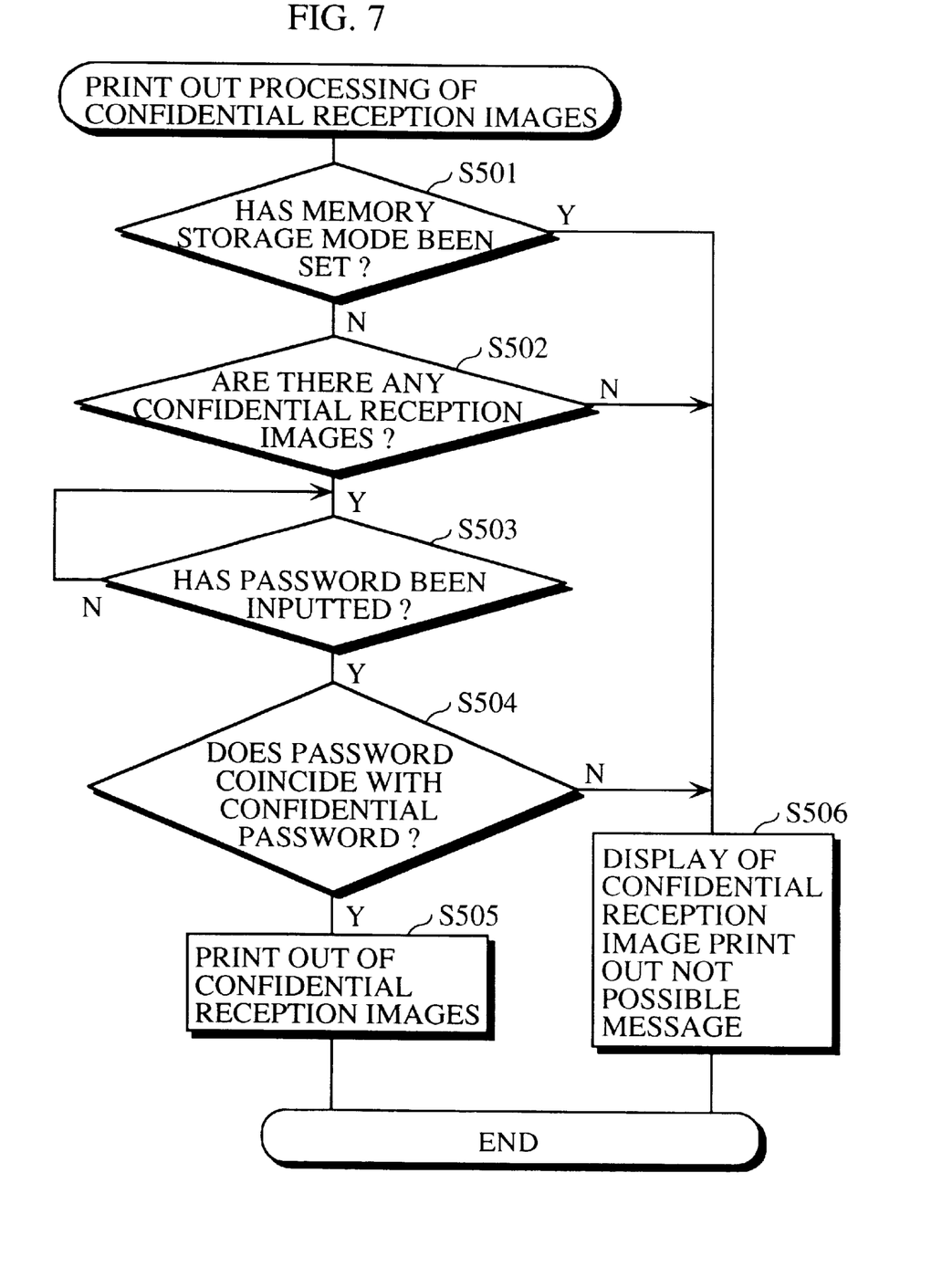
FIG. 7 shows the processing flow for the print out processing of confidential reception images.

This print out processing is shown in more detail by the flowchart in FIG. 7. First, the FAX system control unit 18 judges whether memory storage mode is presently set (step S501). When this is the case, the FAX system control unit 18 has the display unit of the control panel 12 display a message showing that print out of the confidential reception images is not possible (step S506). When memory storage mode is not set, the FAX system control unit 18 judges whether there is any confidential reception images in the memory 14 (step S502). When confidential reception images is present in the memory 14, the control panel 12 waits for the input of a password (step S503). Here, when an inputted password coincides with the confidential password which is appended to the confidential reception images (step S504:yes), the FAX system control unit 18 has these confidential reception images stored in the memory 14 printed out by the printer unit 16 (step S505).

As shown in FIG. 2, when the control panel 12 receives an indication for polling reception (step S109:yes), the FAX system control unit 18 performs polling reception processing (step S110).

Figure 8:
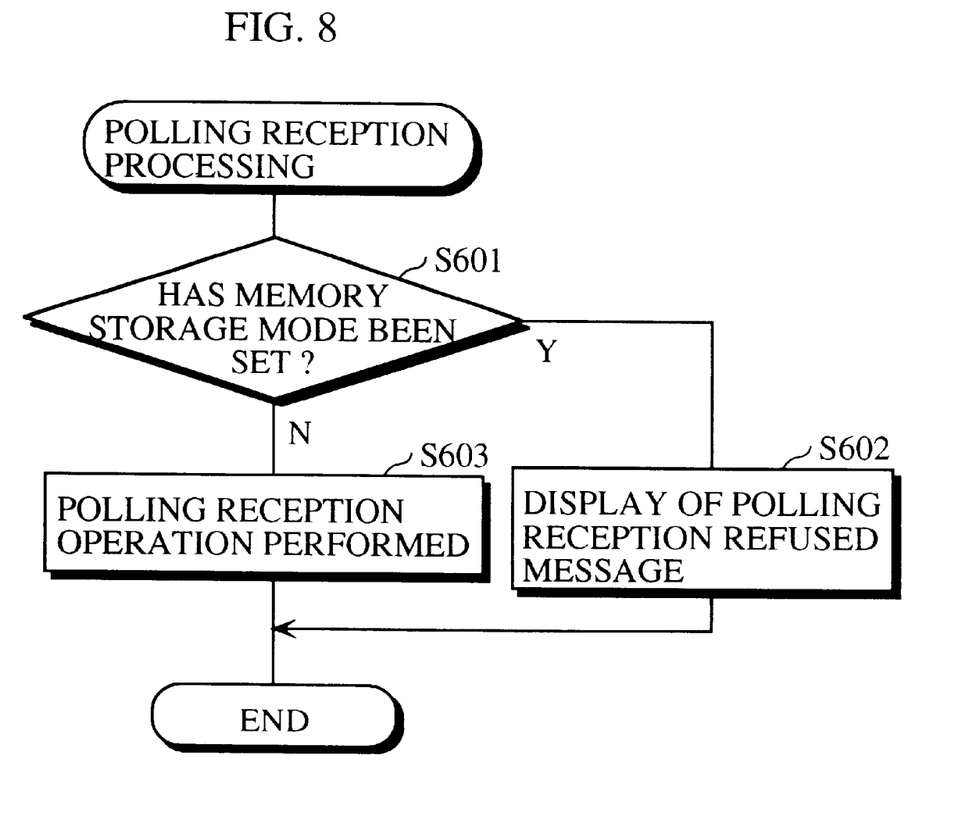
FIG. 8 shows the processing flow of polling reception processing.

This polling reception processing is shown in more detail by the flowchart in FIG. 8. First, the FAX system control unit 18 judges whether memory storage mode is presently set (step S601). When this is the case, the FAX system control unit 18 has the display unit of the control panel 12 display a message showing that polling reception has been refused (step S602). On the other hand, when memory storage mode is not set, the FAX system control unit 18 performs a polling reception operation (step S603).

Figure 3:
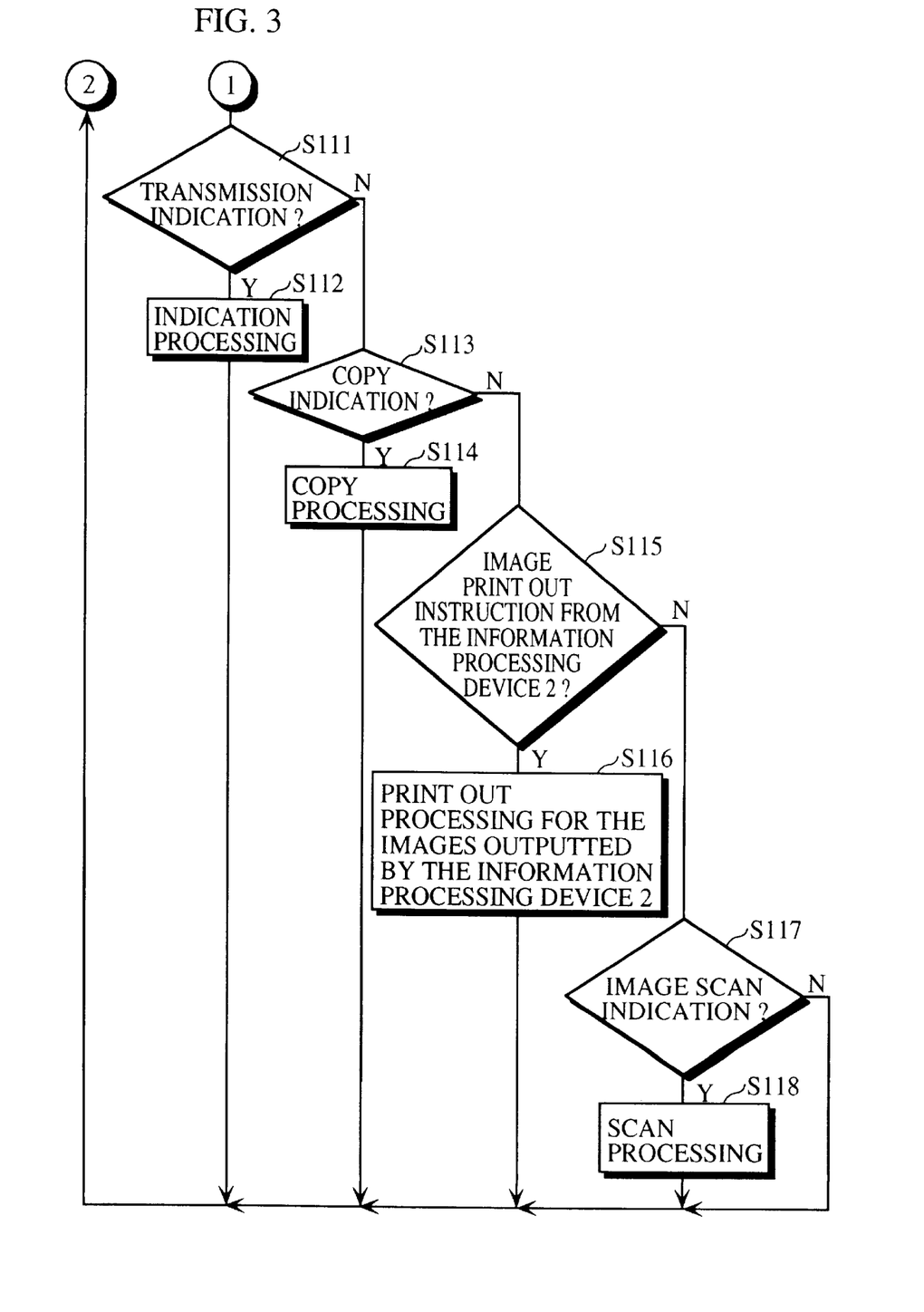
FIG. 3 shows a continuation of the control flow in FIG. 2.

As shown in FIG. 3, when an indication for image transmission is received from either the control panel 12 or the information processing device 2 (step S111:yes), the FAX system control unit 18 performs transmission processing regardless of whether memory storage mode is presently set (step S112). Similarly, when an indication for copying the document image of the document which is currently set on the document platen is received from either the control panel 12 or the information processing device 2 (step S113:yes), the FAX system control unit 18 performs copy processing regardless of whether memory storage mode is presently set (step S114). Also, when an indication for printing out images is received from either the control panel 12 of the information processing device 2 (step S115:yes), the FAX system control unit 18 performs print out processing of the images outputted by the information processing device 2 regardless of whether memory storage mode is presently set (step S116). Finally, when an indication for scanning the document image of the document which is currently set on the document platen is received from either the control panel 12 or the information processing device 2 (step S117:yes), the FAX system control unit 18 performs the scanning of the document image regardless of whether memory storage mode is presently set (step S118). It then transfers the scanned image to the information processing device 2.

It should be noted here that the facsimile machine of the present invention may be provided with a construction for printing out various kinds of reports. These reports may include communication records, lists of telephone numbers and error reports, such as transmission failure reports. The print out of such reports may be performed regardless of a setting of memory storage mode.

It is also possible for the information processing device which is connected to the facsimile machine of the present invention to be connected to the facsimile machine using a public telephone network. In such a case, the control procedure of the FAX system control unit 18 first judges whether image data is being transmitted from a sender facsimile machine via the network control unit 15 by judging whether data is being received according to facsimile procedures. When data is received according to facsimile procedures, the FAX system control unit 18 judges the image data has been transmitted from a sender facsimile machine and performs the reception processing shown as S106 in FIG. 2. On the other hand, when data has not been received according to facsimile procedures, the FAX system control unit 18 judges, for example, whether an image print out instruction has been included in the received data. When such a print out instruction is included in the received data, the FAX system control unit 18 performs the print out processing of step S116. Similar procedures are also performed for other kinds of instructions.

As described above, when memory storage mode has been set, the facsimile machine of the present embodiment is designed to only store images received from a sender facsimile machine in the memory 14, so that print out of confidential reception images is not performed for a predetermined period. Polling reception processing is also forbidden during memory storage mode. On the other hand, other operations, such as image transmission, copying, printing out of images received from the information processing device and image scanning may be performed regardless of whether memory storage mode has been set. As a result, even if the present facsimile machine is connected to an information processing device, the functions of the facsimile machine aside from reception and transmission can still be performed as usual during memory storage mode, with the additional benefit of improved security for reception images.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A facsimile apparatus, comprising:

a printer for printing image data;

a memory for storing image data;

reception means for receiving image data from a sender facsimile machine;

setting means for setting memory storage mode whereby reception image data from the sender facsimile machine is stored in the memory and is prohibited from being printed by the printer for as long as the facsimile apparatus is set in the memory storage mode;

image data write means for writing reception image data received during a setting of memory storage mode into the memory;

control means for controlling a first operation and a second operation, wherein the first operation is performed with one of reception image data stored in the memory and reception image data which is being written into the memory, and wherein the second operation is performed with other image data, the other image data being different from the reception image data stored in the memory and the reception image data which is being written into the memory; and prohibiting means for prohibiting the first operation when the memory storage mode is set.

2. The facsimile apparatus of claim 1, wherein the second operation is performed irrespective of a setting of memory storage mode.

3. The facsimile apparatus of claim 1, wherein the control means further controls a polling reception operation, wherein the polling reception operation is an operation which has image data stored by a sender facsimile machine transmitted to the present facsimile apparatus according to an operation by the present facsimile apparatus and which has the present facsimile apparatus receive the image data, wherein the prohibiting means prohibits a polling reception operation when memory storage mode is set.

4. The facsimile apparatus of claim 1, further comprising:

an interface which can be connected to an external device and which is used for data transfer with the external device; and image print control means which, when the interface is connected to the external device, has image data which is sent from the external device printed by the printer, regardless of whether memory storage mode is set.

5. The facsimile apparatus of claim 1, further comprising:

an interface which can be connected to an external device and which is used for data transfer with the external device; and copying control means which, when the interface is connected to the external device and there is a document copy instruction, has a scanner provided in the present facsimile apparatus scan a document set on a platen and has the printer print image data which has been scanned from the document, regardless of whether memory storage mode is set.

6. The facsimile apparatus of claim 1, wherein the second operation includes a copy operation of communication records, lists of telephone numbers, error records, and transmission failure records.

7. The facsimile apparatus of claim 1, wherein the reception image data includes a first password for allowing printing.

8. The facsimile apparatus of claim 7, further comprising:

input means for inputting a second password; and print permitting means for permitting a printing of the reception image data when the second password coincides with the first password.

9. The facsimile apparatus of claim 1, further comprising cancel means for cancelling memory storage mode.

10. The facsimile apparatus of claim 9, further comprising print control means for controlling the printer to print the reception image data, based on a cancel of the memory storage mode.

11. The facsimile apparatus of claim 9, wherein the cancel means includes a timer which cancels the memory storage mode when a set time measured by the timer is reached.

12. The facsimile apparatus of claim 9, wherein the cancel means includes:

password input means for inputting a password for canceling the memory storage mode; and judging means for judging whether the inputted password coincides with a predetermined canceling password, and wherein the cancel means cancels memory storage mode when the judging unit judges that the inputted password coincides with the predetermined canceling password.

13. The facsimile apparatus of claim 12, further comprising print control means for controlling the printer to print the reception image data, based on a cancel of the memory storage mode.

14. The facsimile apparatus of claim 1, further comprising:

an interface which can be connected to an external device and which is used for data transfer with the external device; and scanning control means which, when the interface is connected to the external device and there is a document scan instruction, has a scanner provided in the present facsimile apparatus scan a document set on a platen, regardless of whether memory storage mode is set.

15. The facsimile apparatus of claim 14, wherein the scanning control means sends image data of the document read by the scanner to the external device via the interface.

16. The facsimile apparatus of claim 1, further comprising:
an interface which can be connected to an external device and which is used for data transfer with the external device;
transferring means for transferring image data received from the sender facsimile machine to the external device via the interface, when the interface is connected to the external device; and
transfer prohibiting means for prohibiting any transfer of the reception image data by the transferring means during memory storage mode.

17. The facsimile apparatus of claim 16, wherein the external device connected to the interface is a personal computer.

18. The facsimile apparatus of claim 16, wherein the external device connected to the interface is a workstation.

19. The facsimile apparatus of claim 1, wherein all of the reception image data is prohibited from being printed by the printer when the facsimile apparatus is set in the memory storage mode.

20. The facsimile apparatus of claim 1, wherein all of the reception image data is prohibited from being printed by the printer when the facsimile apparatus is set in the memory storage mode.

21. The facsimile apparatus of claim 1, wherein the first operation is a printing operation.

22. The facsimile apparatus of claim 1, wherein the second operation is a printing operation.

23. A facsimile apparatus which is connected to an external device, comprising:
a printer for printing image data;
a memory for storing image data;
reception means for receiving image data from a sender facsimile machine;
setting means for setting memory storage mode whereby reception image data from the sender facsimile machine is stored in the memory and is prohibited from being printed by the printer;
image data write means for writing reception image data received during a setting of memory storage mode into the memory;
transfer means for transferring reception image data to the external device; and
transfer prohibiting means for prohibiting transfer of reception image data by the transfer means during memory storage mode.

24. The facsimile apparatus of claim 23, further comprising cancel means for cancelling memory storage mode.

25. The facsimile apparatus of claim 24, further comprising print control means for controlling the printer to print the reception image data, based on a cancel of the memory storage mode.

26. The facsimile apparatus of claim 23, wherein all of the reception image data is prohibited from being transferred by the transfer means when the facsimile apparatus is set in the memory storage mode.

27. The facsimile apparatus of claim 23, wherein the reception image data is prohibited from being transferred by the transfer means for as long as the facsimile apparatus is set in the memory storage mode.

28. The facsimile apparatus of claim 27, wherein all of the reception image data is prohibited from being transferred by the transfer means when the facsimile apparatus is set in the memory storage mode.

29. A facsimile apparatus which is connected to an external device, comprising:
a printer for printing image data;
a memory for storing image data;
reception means for receiving image data from a sender facsimile machine;
setting means for setting memory storage mode whereby reception image data from the sender facsimile machine is stored in the memory and is prohibited from being printed by the printer; and
image print control means which, when there is a printing instruction for image data sent from the external device, has the printer print the image data regardless of whether memory storage mode is set.

30. A facsimile apparatus which is connected to a first external device, comprising:
a printer for printing image data;
a memory for storing image data;
reception means for receiving image data from a second external device that is a sender facsimile machine;
setting means for setting a memory storage mode whereby reception image data from the sender facsimile machine is stored in the memory and is prohibited from being printed by the printer; and
scanning control means which, when there is an instruction to scan a document, has image data read from a document set on a platen of the facsimile apparatus by a scanner provided in the facsimile apparatus and which has the image data for the scanned document sent to the first external device.

31. The facsimile apparatus of claim 30, wherein the first external device is an information processing device.

32. The facsimile apparatus of claim 30, wherein the reception image data is prohibited from being printed when the facsimile apparatus is set in the memory storage mode.

33. A facsimile apparatus which is connected to an external device, comprising:
a printer for printing image data;
a memory for storing image data;
reception means for receiving image data from a sender facsimile machine;
setting means for setting memory storage mode whereby reception image data from the sender facsimile machine is stored in the memory and is prohibited from being printed by the printer for as long as the facsimile apparatus is set in the memory storage mode; and
copying control means which, when there is an instruction to copy a document, has image data scanned from a document set on a platen of the facsimile apparatus by a scanner provided in the facsimile apparatus regardless of whether memory storage mode is set and which has the image data for the scanned document printed by the printer.

34. The facsimile apparatus of claim 33, wherein all of the reception image data is prohibited from being printed by the printer when the facsimile apparatus is set in the memory storage mode.

35. The facsimile apparatus of claim 33, wherein all of the reception image data is prohibited from being printed by the printer when the facsimile apparatus is set in the memory storage mode.

36. The facsimile apparatus of claim 33, wherein the external device is a different device than the sender facsimile machine.

37. A facsimile apparatus, comprising:

a printer for printing image data;

a memory for storing image data;

setting means for setting memory storage mode whereby reception image data from the sender facsimile machine is stored in the memory and is prohibited from being printed by the printer when the facsimile apparatus is set in the memory storage mode;

control means for controlling a first operation and a second operation, wherein the first operation is performed with stored image data and wherein the second operation is performed independent of stored image data; and prohibiting means for prohibiting the first operation when the memory storage mode is set.

38. The facsimile apparatus of claim 37, wherein the first operation includes printing the reception image data.

39. The facsimile apparatus of claim 37, wherein the first operation includes transmitting the reception image data to an information processing device.

40. The facsimile apparatus of claim 37, wherein the first operation includes printing the reception image data and transmitting the reception image data to an information processing device.

* * * * *